(12) United States Patent
Fang

(10) Patent No.: US 10,184,255 B2
(45) Date of Patent: Jan. 22, 2019

(54) PRODUCTION METHOD OF WOODEN FLOOR

(71) Applicant: Qinliang Fang, Huzhou (CN)

(72) Inventor: Qinliang Fang, Huzhou (CN)

(\*) Notice: Subject to any disclaimer, the term of this patent is extended or adjusted under 35 U.S.C. 154(b) by 207 days.

(21) Appl. No.: 15/002,654

(22) Filed: Jan. 21, 2016

(65) Prior Publication Data

US 2016/0281371 A1 Sep. 29, 2016

(30) Foreign Application Priority Data

Mar. 26, 2015 (CN) .......................... 2015 1 0136403

(51) Int. Cl.
*E04F 15/10* (2006.01)
*E04F 15/02* (2006.01)
*B32B 37/12* (2006.01)
B32B 37/10 (2006.01)
B32B 37/06 (2006.01)
B32B 38/00 (2006.01)

(52) U.S. Cl.
CPC ........ *E04F 15/107* (2013.01); *B32B 37/1292* (2013.01); *E04F 15/02038* (2013.01); *E04F 15/105* (2013.01); *B32B 37/06* (2013.01); *B32B 37/10* (2013.01); *B32B 37/12* (2013.01); *B32B 38/0036* (2013.01); *B32B 2309/125* (2013.01); *B32B 2317/16* (2013.01); *B32B 2419/04* (2013.01); *E04F 2290/043* (2013.01)

(58) Field of Classification Search
CPC . E04F 15/107; E04F 15/02038; E04F 15/105; E04F 2290/043; B32B 37/12; B32B 37/10; B32B 37/06; B32B 37/1292; B32B 38/0036; B32B 2309/125; B32B 2317/16; B32B 2419/04
See application file for complete search history.

(56) References Cited

U.S. PATENT DOCUMENTS

| | | | |
|---|---|---|---|
| 8,202,389 B2 * | 6/2012 | Handojo | B27D 1/06 156/250 |
| 2007/0116931 A1 * | 5/2007 | Lu | B44C 5/0461 428/167 |
| 2009/0139170 A1 * | 6/2009 | Thiers | B44C 5/04 52/309.1 |

\* cited by examiner

*Primary Examiner* — Vishal I Patel
(74) *Attorney, Agent, or Firm* — Stuart H. Mayer; Mayer & Williams PC

(57) ABSTRACT

A method of producing a wooden floor uses a core board as a base material. The base material is conditioned and a skin layer is connected to the upper surface of the core board. A back layer is connected to the lower surface of the core board after the conditioning to obtain the wooden floor. The wooden floor is notched and painted.

19 Claims, 2 Drawing Sheets

PRODUCTION METHOD OF WOODEN FLOOR

TECHNICAL FIELD

The invention relates to a production method of wooden floor, and in particular to a production method of wooden floor made of a core board.

BACKGROUND

At present, in order to reduce cost of production and protect the environment, people start to advocate the use of wooden floor made of wood-based panel such as density board. Since the density board has a poor stability, the wooden floor made of the density board has a large expansion ratio and a large amount of deformation when being affected with damp. Thus, in the conventional producing method of wooden floor using density board, the density board is generally glued with multiple layers of veneers. With multiple glued layers, a tension among wood fibers is increased, and the stability of the wooden floor is improved.

However a large quantity of glue will be required when the adjacent density board and veneers are to be glued and hot-pressed. Meanwhile, the conventional glue contains formaldehyde, and using a large quantity of glue will increase an overall formaldehyde content of the wooden floor. Further the production cost will increase. Therefore the conventional wooden floor has a problem of comparatively high formaldehyde content and a comparatively high production cost.

SUMMARY OF THE INVENTION

In view of the above and in order to solve the problems in the prior art, the present invention provides a production method of wooden floor, which has the advantages of reducing formaldehyde content and production cost.

In order to achieve the above-mentioned objects, one aspect of the invention provides a production method of wooden floor.

A production method of wooden floor of the present invention comprises: using a core board as a base material and conditioning the base material; connecting a skin layer to the upper surface of the core board and connecting a back layer to the lower surface of the core board after the conditioning so as to obtain the wooden floor; and notching and painting the wooden floor.

Alternatively, the production method of wooden floor can comprise the following steps:

a. using a core board as a base material and conditioning the base material to obtain a semi-finished product A;

b. adhering a back layer to the lower surface of the semi-finished product A, and performing hot press to obtain a semi-finished product B;

c. conditioning the semi-finished product B to obtain a semi-finished product C;

d. adhering a skin layer to the upper surface of the semi-finished product C, and pressing the skin layer to the upper surface of the semi-finished product C by hot press to obtain a semi-finished product D;

e. conditioning the semi-finished product D to obtain the wooden floor; and f. notching and painting the wooden floor.

Alternatively, the production method of wooden floor can comprise the following steps:

a. using a core board as a base material and conditioning the base material to obtain a semi-finished product A;

b. adhering a back layer to the lower surface of the semi-finished product A, and performing hot press to obtain a semi-finished product B;

c. conditioning the semi-finished product B to obtain a semi-finished product C;

d. adhering a skin layer to the upper surface of the semi-finished product C, and pressing the skin layer to the upper surface of the semi-finished product C by cold press to obtain the wooden floor; and e. notching and painting the wooden floor.

According to the technical solutions of the invention, the invention adopts a method of adhering and pressing the surface layer (such as a natural veneer) and the back layer (such as an equilibrium paper) to the surface of the core board, thereby enhancing the practicability of the wooden floor. Further the glue is only used when adhering and pressing the natural veneer or the PVC surface layer and the equilibrium paper or the wood grain paper, thereby reducing the glue quantity, and effectively reducing the formaldehyde content by 30% or more. Furthermore, the times and the degree of the gluing and hot press are reduced, which can reduce the production cost by 30% or more. Moreover, the object of reducing glue and saving cost can be also achieved by providing the surface layer on the upper surface of the core board and providing the paint layer on the lower surface of the core board. Thus, the technical solutions of the invention not only reduce formaldehyde content and improve an environmental protection performance, but also have advantages of a low production cost and a strong practicability. The wooden floor can be easily assembled by notching the wooden floor based on a flat buckle type notch or a lock buckle type notch. Paining the wooden floor will protect the surface of the wooden floor, and lead to a bright color of the wooden floor.

BRIEF DESCRIPTION OF THE DRAWINGS

The accompanied figures are used for a better understanding of the invention, but are not intended to constitute limitations of the invention. Wherein.

DETAILED DESCRIPTION

Figure 1:
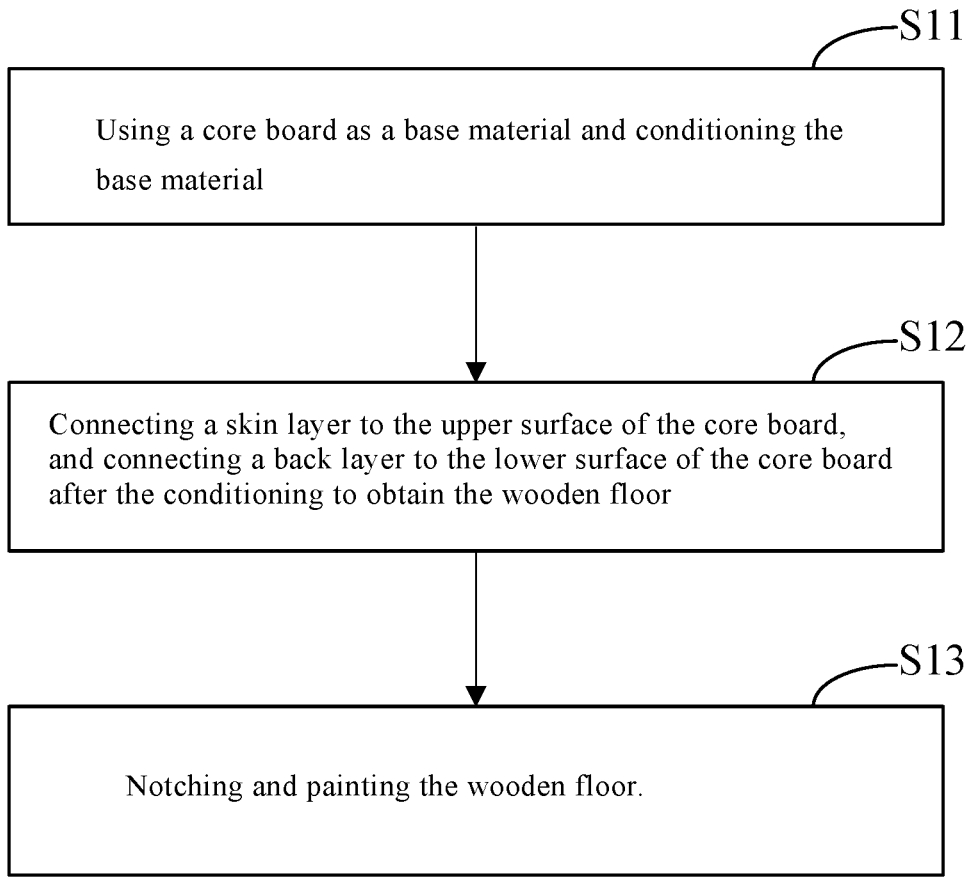
FIG. 1 is a schematic diagram showing main steps of the production method of wooden floor according to an embodiment of the invention.

In one of the technical solutions of the invention, as shown in FIG. 1, the production method of wooden floor may comprise the following steps: Step S11: using a core board as a base material and conditioning the base material; Step S12: after the conditioning being completed, connecting a skin layer to the upper surface of the core board, and connecting a back layer to the lower surface of the core board to obtain the wooden floor; and Step S13: notching and painting the wooden floor. The term "conditioning" refers to a process that, since the interior of the density board that has just been produced or treated is with a certain temperature, the density board is required to be placed in a specific temperature and humidity environment for a period of time, so that the density board can be adapted to the production environment. The object of the conditioning is to increase the stability of the core board such as a high density board, so that the core board is not easily deformed.

The core board may be a high density board or a flake board, the back layer may be one of an equilibrium paper and a wood grain paper, and the skin layer may be a natural veneer or a PVC (i.e., polyvinyl chloride, called PVC for short, which is a polymer formed by polymerization of a vinyl chloride monomer (called VCM for short) under actions of initiators such as a superoxide and an azoic compound or under actions of light and heat in accordance with a mechanism of free-radical polymerization; a vinyl chloride homopolymer and a vinyl chloride copolymer are known collectively as vinyl chloride resins; a material thereof is one non-crystalline material; a stabilizing agent, a lubricating agent, an auxiliary processing agent, a colorant, an impact resisting agent and other additives are usually added to a PVC material during an actual use; it has a low flammability, a high strength, a resistance to a climate change and a good geometric stability) surface layer.

Furthermore, the production method of wooden floor of this technical solution further comprises: connecting one or more of a silence pad, a moisture-proof pad and a cork pad to the lower surface of the back layer connected to the lower surface of the core board in accordance with actual requirements for silence, moisture proof and the like. Moreover, in order to facilitate subsequent installations of the wooden floor, it is generally required to notch the wooden floor. Furthermore, the wooden floor can be further painted to protect the surface of the wooden floor and have a bright color.

Figure 2:
FIG. 2 is a schematic diagram showing a notch of a flat buckle when notching the wooden floor according to an embodiment of the invention.

In the embodiment of the invention, when the wooden floor is notched, the notch can be designed and selected in accordance with factors such as installation environment, e.g., the notch can be of a buckle type of a flat buckle or a lock buckle. The lock buckle is a concept corresponding to the flat buckle, and the design principle of the lock buckle is to make the floor not easily misplaced and deformed by means of a tension force between the wooden floors after the wooden floors are assembled. In the installation process, it generally needs glue to assemble the wooden floors with the notch of the buckle type of the flat buckle, while the glue is not required for the lock buckle, which reduces labor cost. Depending on the material, the manufacturing process, the installation environment and the like of the wooden floor, people may perform the notching with buckle type notch or flat buckle type notch. FIG. 2 shows a notch of the flat buckle, and FIGS. 3A and 3B show a notch of the lock buckle.

As shown in FIG. 2, the reference sign 1 denotes a groove located on one side of the wooden floor, the reference sign 2 denotes a tenon located on an opposite side of the wooden floor, and the reference signs 1 and 2 denote a notch of a flat buckle. During the installation, the groove 1 of one wooden floor is assembled with the tenon 2 of the other wooden floor.

Figure 3A:
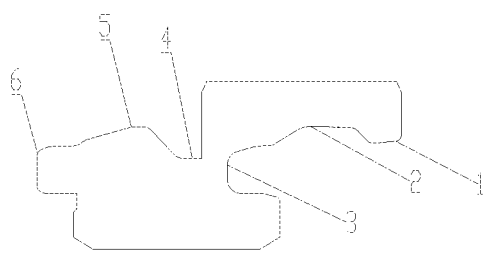
FIGS. 3A and 3B are schematic diagrams showing a notch of a lock buckle when notching the wooden floor according to an embodiment of the invention.
Figure 3B:
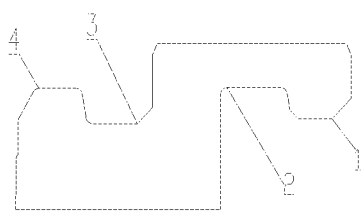

FIGS. 3A and 3B are schematic diagrams showing two lock buckles having different shapes, and the actual shape of the lock buckle can be adjusted or changed in accordance with actual conditions. As shown in FIG. 3A, the lock buckle comprises a tenon 1, a groove 2 and a groove 3 located on one side of the wooden floor, and a groove 4, a tenon 5 and a tenon 6 located on the other opposite side of the wooden floor. The shape of the tenon 1 corresponds to that of the groove 4, the shape of the groove 2 corresponds to that of the tenon 5, and the shape of the groove 3 corresponds to that of the tenon 6. During the installation, the tenon 1, the groove 2 and the groove 3 of one wooden floor are assembled with the groove 4, the tenon 5 and the tenon 6 of the other wooden floor.

As shown in FIG. 3B, the lock buckle comprises a tenon 1 and a groove 2 located on one side of the wooden floor, and a groove 3 and a tenon 4 located on the other opposite side of the wooden floor. The shape of the tenon 1 corresponds to that of the groove 3, and the shape of the groove 2 corresponds to that of the tenon 4. During the installation, the tenon 1 and the groove 2 of one wooden floor are assembled with the groove 3 and the tenon 4 of the other wooden floor.

In one embodiment of this technical solution, the production method of wooden floor may comprise the following steps:

a. using a core board as a base material and conditioning the base material to obtain a semi-finished product A;

b. adhering a back layer to the lower surface of the semi-finished product A and performing hot press to obtain a semi-finished product B;

c. conditioning the semi-finished product B to obtain a semi-finished product C;

d. adhering a skin layer to the upper surface of the semi-finished product C, and pressing the skin layer to the upper surface of the semi-finished product C by hot press to obtain a semi-finished product D; and e. conditioning the semi-finished product D to obtain the wooden floor.

Furthermore, after the conditioning in the step e, a step f, i.e., notching and painting the wooden floor, can be further performed in accordance with actual production requirements.

In a preferred embodiment, the step a may comprise using a core board having a thickness of 6 mm-12 mm as a base material, and conditioning the base material to obtain a semi-finished product A; the step b comprises adhering a back layer to the lower surface of the semi-finished product A, and performing hot press to obtain a semi-finished product B, in which an upper steel board for the hot press has a temperature of 180° C.-210° C., a lower steel board has a temperature of 180° C.-220° C., the hot press continues 20 seconds-30 seconds with a pressure of 10 MPa-15 MPa; and the step d comprises adhering a skin layer having a thickness of 0.3 mm-3 mm to the upper surface of the semi-finished product C by using 80 g-400 g of glue and pressing the skin layer to the upper surface of the semi-finished product C by hot press with a temperature of 90° C.-110° C., and the hot press may continue 350 seconds-450 seconds, to obtain a semi-finished product D.

Further, the step a may comprise using a core board having a thickness of 9 mm as a base material, and conditioning the base material to obtain a semi-finished product A; the step b comprises adhering a back layer to the lower surface of the semi-finished product A, and then performing hot press to obtain a semi-finished product B, in which an upper steel board for the hot press has a temperature of 195V, a lower steel board for the hot press has a temperature of 203° C., the hot press continues 27 seconds with a pressure of 13.5 MPa; and the step d comprises adhering a skin layer having a thickness of 1.0 mm to the upper surface of the semi-finished product C by using 200 g of glue, and then pressing the skin layer to the upper surface of the semi-finished product C by hot press with a temperature of 100° C., and the hot press may continue 400 seconds, to obtain a semi-finished product D.

In a preferred embodiment, a glue of 85 g is used during the adhesion of the back layer in the step b; and the conditioning time in the step a, c and e is 7 days-10 days.

Specifically, the above embodiments may comprise the following solutions:

Solution I:

A production method of wooden floor may comprise the following steps:

a. using a high density board having a thickness of 6 mm-12 mm as a base material, and conditioning the base material for 7 days-10 days to obtain a semi-finished product A;

b. adhering an equilibrium paper or a wood grain paper to the lower surface of the semi-finished product A by using 85 grams of glue, and then performing hot press to obtain a semi-finished product B, in which an upper steel board for the hot press has a temperature of 180° C.-210° C., a lower steel board temperature for the hot press has a temperature of 180° C.-220° C., the hot press continues 20 seconds-30 seconds with a pressure of 10 MPa-15 MPa;

c. conditioning the semi-finished product B for 7 days-10 days to obtain a semi-finished product C;

d. adhering a natural veneer having a thickness of 0.3 mm-3 mm to the upper surface of the semi-finished product C by using 80-400 grams of glue, and then pressing the natural veneer to the upper surface of the semi-finished product C by hot press with a temperature of 90° C.-110° C.; the hot press continuing 350-450 seconds, to obtain a semi-finished product D;

e. conditioning the semi-finished product D for 7 days-10 days to obtain the wooden floor; and f. notching and painting the wooden floor.

Solution II:

A production method of wooden floor may comprise the following steps:

the step b comprising adhering an equilibrium paper to the lower surface of the semi-finished product A by using 85 grams of glue, and then performing hot press to obtain a semi-finished product B, in which an upper steel board for the hot press has a temperature of 195° C., a lower steel board temperature for the hot press has a temperature of 203° C., the hot press continues 27 seconds with a pressure of 13.5 MPa.

In addition, the conditioning time of the semi-finished product B in step c is 7 days; and other steps are the same as those in solution I.

Solution III:

A production method of wooden floor may comprise the following steps:

In the step a, the thickness of the high density board is 9 mm;

the step d comprises adhering a natural veneer having a thickness of 1.0 mm to the upper surface of the semi-finished product C by using 200 grams of glue, and then pressing the natural veneer to the upper surface of the semi-finished product C by hot press with a temperature of 100° C., and the hot press continues 400 seconds, to obtain a semi-finished product D; and other steps are the same as those in solution II.

In another embodiment of this technical solution, the production method of wooden floor can further comprise the following steps:

a. using a core board as a base material, and conditioning the base material to obtain a semi-finished product A;

b. adhering a back layer to the lower surface of the semi-finished product A, and then performing hot press to obtain a semi-finished product B;

c. conditioning the semi-finished product B to obtain a semi-finished product C;

d. adhering a skin layer to the upper surface of the semi-finished product C, and then pressing the skin layer to the upper surface of the semi-finished product C by cold press to obtain the wooden floor; and e. notching and painting the wooden floor.

In a preferred embodiment, the step a comprises using a core board having a thickness of 6 mm-12 mm as a base material, and conditioning the base material to obtain a semi-finished product A. The step b comprises adhering a back layer to the lower surface of the semi-finished product A, and then performing hot press to obtain a semi-finished product B, in which an upper steel board for the hot press has a temperature of 180° C.-210° C., a lower steel board has a temperature of 180° C.-220° C., the hot press continues 20-30 seconds with a pressure of 10 MPa-15 MPa. The step d comprises adhering a skin layer having a thickness of 0.3 mm-3 mm to the upper surface of the semi-finished product C by using 30-100 grams of glue, then pressing the skin layer to the upper surface of the semi-finished product C by cold press with a pressure of 1 MPa-20 MPa, and then resting the product for 12-36 hours after the cold press to obtain the wooden floor.

Further, the step a may comprise using a core board having a thickness of 9 mm as a base material, and conditioning the base material to obtain a semi-finished product A. The step b may comprise adhering a back layer to the lower surface of the semi-finished product A, and then performing hot press to obtain a semi-finished product B, in which an upper steel board for the hot press has a temperature of 195° C., a lower steel board has a temperature of 203° C., the hot press continues 27 seconds with a pressure of 13.5 MPa. The step d comprises adhering a skin layer having a thickness of 1.0 mm to the upper surface of the semi-finished product C by using 35 grams of glue, then pressing the skin layer to the upper surface of the semi-finished product C by cold press with a pressure of 100 MPa, and then resting the product for 24 hours after the cold press to obtain the wooden floor.

In a preferred embodiment, 85 grams of glue is used in the step b to adhere the back layer; and the conditioning time in the steps a and c are both 7-10 days.

Specifically, the above embodiments may include the following solutions:

Solution I:

A production method of wooden floor may comprise the following steps:

a. using a high density board having a thickness of 6 mm-12 mm as a base material, and conditioning the base material for 7 days-10 days to obtain a semi-finished product A;

b. adhering an equilibrium paper to the lower surface of the semi-finished product A by using 85 grams of glue, and then performing hot press to obtain a semi-finished product B, in which an upper steel board for the hot press has a temperature of 180° C.-210° C., a lower steel board has a temperature of 180° C.-220° C., the hot press continues 20-30 seconds with a pressure of 10 MPa-15 MPa;

c. conditioning the semi-finished product B for 7 days-10 days to obtain a semi-finished product C;

d. adhering a natural veneer having a thickness of 0.3 mm-3 mm to the upper surface of the semi-finished product C by using 30-100 grams of glue, then pressing the natural veneer to the upper surface of the semi-finished product C by cold press with a pressure of 1 MPa-20 MPa, and resting the product for 12-36 hours after the cold press to obtain the wooden floor; and e. notching and painting the wooden floor.

Solution II:

A production method of wooden floor may comprise the following steps:

the step b comprising adhering an equilibrium paper to the lower surface of the semi-finished product A, and then performing hot press to obtain a semi-finished product B, in which the upper steel board for the hot press has a temperature of 195° C., the lower steel board has a temperature of 203° C., the hot press continues 27 seconds with a pressure of 13.5 MPa;

the conditioning time of the semi-finished product B in the step c being 7 days; and other steps being the same as those in Solution I.

Solution III:

A production method of wooden floor may comprise the following steps:

the step a comprising using a high density board having a thickness of 9 mm as a base material; the step d comprising adhering a natural veneer having a thickness of 1.0 mm to the upper surface of the semi-finished product C by using 35 grams of glue, then pressing the natural veneer to the upper surface of the semi-finished product C by cold press with a pressure of 10 MPa, and resting the product for 24 hours after the cold press to obtain the wooden floor; and other steps being the same as those in Solution II.

In another technical solution of the invention, the production method of wooden floor may comprise the following steps: using a core board as a base material and conditioning the base material; connecting a skin layer to the upper surface of the core board, and providing a paint layer on the lower surface of the core board after the conditioning to obtain the wooden floor; and notching and painting the wooden floor.

The core board can be a high density board or a flake board, and the skin layer can be a natural veneer or a PVC surface layer.

Furthermore, the production method of wooden floor of this technical solution further comprises: connecting one or more of a silence pad, a moisture-proof pad and a cork pad to the lower surface of the paint layer depending on actual requirements for silence, moisture proof and the like. Moreover, in order to facilitate a subsequent installation of the wooden floor, it is generally required to notch the wooden floor. Furthermore, the wooden floor can be further painted to protect the surface of the wooden floor so as to have a bright appearance. It is allowed to have a buckle type notching or flat buckle type notching during the notching. Specific shapes of the flat buckle or the lock buckle have been discussed above and it is not necessary to provide further detailed description.

In one embodiment of this technical solution, the production method of wooden floor may comprise the following steps:

a. using a core board as a base material, and conditioning the base material to obtain a semi-finished product A;

b. providing a paint layer on the lower surface of the semi-finished product A to obtain a semi-finished product B;

c. adhering a skin layer to the upper surface of the semi-finished product B, and then pressing the skin layer to the upper surface of the semi-finished product B by hot press to obtain a semi-finished product C;

d. conditioning the semi-finished product C to obtain the wooden floor; and e. notching and painting the wooden floor.

In a preferred embodiment, the step a comprises using a core board having a thickness of 6 mm-12 mm as a base material, and conditioning the base material to obtain a semi-finished product A. The step b comprises spraying a paint of 20 g-150 g on the lower surface of the semi-finished product A to obtain a semi-finished product B; and the step c comprises adhering a skin layer having a thickness of 0.3 mm-3 mm to the upper surface of the semi-finished product B by using 80-400 g of glue, and then pressing the skin layer to the upper surface of the semi-finished product B by hot press with a temperature of 90° C.-110° C., and the hot press continuing 350-450 seconds, to obtain a semi-finished product C.

Further, the step a comprises using a core board having a thickness of 9 mm as a base material, and conditioning the base material to obtain a semi-finished product A. The step b comprises spraying a paint of 30 g on the lower surface of the semi-finished product A to obtain a semi-finished product B; and the step c comprises adhering a skin layer having a thickness of 1 mm to the upper surface of the semi-finished product B by using 200 g of glue, and then pressing the skin layer to the upper surface of the semi-finished product B by hot press with a temperature of 100° C., and the hot press continuing 400 seconds, to obtain a semi-finished product C.

In a preferred embodiment, the conditioning time in the steps a and d are both 7 days-10 days.

Specifically, the above-mentioned embodiment may comprise the following solutions:

Solution I:

A production method of wooden floor can comprise the following steps:

a. using a high density board having a thickness of 6 mm-12 mm as a base material, and conditioning the base material for 7 days-10 days to obtain a semi-finished product A;

b. spraying a paint of 20 g-150 g on the lower surface of the semi-finished product A to obtain a semi-finished product B;

c. adhering a natural veneer having a thickness of 0.3 mm-3 mm to the upper surface of the semi-finished product by using 80 g-400 g of glue, and then pressing the natural veneer to the upper surface of the semi-finished product B by hot press, in which the hot press has a temperature of 90° C.-110° C., and continues 350 seconds-450 seconds, to obtain a semi-finished product C;

d. conditioning the semi-finished product C for 7-10 days to obtain the wooden floor; and e. notching and painting the wooden floor.

Solution II:

A production method of wooden floor comprises the following steps:

The step b comprising spraying a paint of 30 g on the lower surface of the semi-finished product A to obtain a semi-finished product B; and other steps being the same as those in solution I.

Solution III:

A production method of wooden floor comprises the following steps:

the step a comprising using a high density board having a thickness of 9 mm as a base material, the step c comprising adhering a natural veneer having a thickness of 1.0 mm to the upper surface of the semi-finished product B by using 200 g of glue, and then pressing the natural veneer to the upper surface of the semi-finished product B by hot press, in which the hot press has a temperature of 100° C., and continues 400 seconds, to obtain a semi-finished product C; and other steps being the same as those in solution II.

In another embodiment of this technical solution, the production method of wooden floor can further comprise the following steps:

a. using a core board as a base material, and conditioning the base material to obtain a semi-finished product A;

b. providing a paint layer on the lower surface of the semi-finished product A to obtain a semi-finished product B;

c. adhering a skin layer to the upper surface of the semi-finished product B, and then pressing the skin layer to the upper surface of the semi-finished product B by cold press to obtain the wooden floor; and d. notching and painting the wooden floor.

In a preferred embodiment, the step a comprises using a core board having a thickness of 6 mm-12 mm as a base material, and conditioning the base material to obtain a semi-finished product A. The step b comprises spraying a paint of 20 g-150 g on the lower surface of the semi-finished product A to obtain a semi-finished product B; and the step c comprises adhering a skin layer having a thickness of 0.3 mm-3 mm to the upper surface of the semi-finished product B by using 30-100 g of glue, then pressing the skin layer to the upper surface of the semi-finished product B by cold press with a pressure of 1 MPa-20 MPa, and resting the product for 20-24 hours after the cold press to obtain the wooden floor.

Further, the step a can comprise using a core board having a thickness of 9 mm as a base material, and conditioning the base material to obtain a semi-finished product A. The step b comprises spraying a paint of 30 g on the lower surface of the semi-finished product A to obtain a semi-finished product B; and the step c comprises adhering a skin layer having a thickness of 1.0 mm to the upper surface of the semi-finished product B by using 35 g of glue, then pressing the skin layer to the upper surface of the semi-finished product B by cold press with a pressure of 10 MPa, and resting the product for 20-24 hours after the cold press to obtain the wooden floor.

In a preferred embodiment, the conditioning time in the step a is 7 days-10 days.

Specifically, the above-mentioned embodiment may comprise the following solutions:

Solution I:

A production method of wooden floor comprises the following steps:

a. using a high density board having a thickness of 6 mm-12 mm as a base material, and conditioning the base material for 7 days-10 days to obtain a semi-finished product A;

b. spraying a paint of 20 g-150 g on the lower surface of the semi-finished product A to obtain a semi-finished product B;

c. adhering a natural veneer having a thickness of 0.3 mm-3 mm to the upper surface of the semi-finished product B by using 30 g-100 g of glue, then pressing the natural veneer to the upper surface of the semi-finished product B by cold press with a pressure of 1 MPa-20 MPa, resting the product for 20-24 hours after the cold press to obtain the wooden floor; and d. notching and painting the wooden floor.

Solution II:

A production method of wooden floor comprises the following steps:

the step b comprising spraying a paint of 30 g on the lower surface of the semi-finished product A to obtain a semi-finished product B; and other steps being the same as those in solution I.

Solution III:

A production method of wooden floor comprises the following steps:

the step a comprising using a high density board having a thickness of 9 mm as a base material;

a step c comprising adhering a natural veneer having a thickness of 1.0 mm to the upper surface of the semi-finished product B by using 35 g of glue, then pressing the natural veneer to the upper surface of the semi-finished product B by cold press with a pressure of 10 MPa, and resting the product for 24 hours after the cold press to obtain the wooden floor; and other steps being the same as those in solution II.

It can be seen from the above descriptions that the invention adopts a method of adhering and pressing the surface layer (such as a natural veneer) and the back layer (such as an equilibrium paper) to the surface of the core board, thereby enhancing the practicability of the wooden floor. Further the glue is only used when adhering and pressing the natural veneer or the PVC surface layer and the equilibrium paper or the wood grain paper, thereby reducing the glue quantity, and effectively reducing the formaldehyde content by 30% or more. Furthermore, the times and the degree of the gluing and hot press are reduced, which can reduce the production cost by 30% or more. Moreover, the object of reducing glue and saving cost can be also achieved by providing the surface layer on the upper surface of the core board and providing the paint layer on the lower surface of the core board. Thus, the technical solutions of the invention not only reduce formaldehyde content and improve an environmental protection performance, but also have advantages of a low production cost and a strong practicability. The wooden floor can be easily assembled by notching the wooden floor based on a flat buckle type notch or a lock buckle type notch. Paining the wooden floor will protect the surface of the wooden floor, and lead to a bright color of the wooden floor.

The above embodiments are not intended to limit the scope of protection of the invention. Those skilled in the art should understand that various modifications, combinations, sub-combinations and replacements may be adopted depending on design requirements and other factors. Any modification, equivalent replacement, improvement and the like made within the spirit and principle of the invention should be contained in the scope of protection of the invention.

The invention claimed is:

1. A production method of a wooden floor comprising the following steps:
   a. using a core board as a base material, and conditioning the base material to obtain a semi-finished product A;
   b. connecting a back layer to the lower surface of the semi-finished product A, and then performing hot press to obtain semi-finished product B;
   c. conditioning the semi-finished product B to obtain a semi-finished product C;
   d. adhering a skin layer to an upper surface of the semi-finished product C, and then pressing the skin layer to the upper surface of the semi-finished product C by hot press to obtain a semi-finished product D;
   e. conditioning the semi-finished product D to obtain the wooden floor; and
   f. notching and painting the wooden floor.

2. The production method of wooden floor according to claim 1, characterized in that the core board is a high density board or a flake board, the back layer is one of an equilibrium paper and a wood grain paper, and the skin layer is a natural veneer or a PVC surface layer.

3. The production method of wooden floor according to claim 1, characterized in that the method further comprises: connecting one or more of a silence pad, a moisture-proof pad and a cork pad to the lower surface of the back layer.

4. The production method of wooden floor according to claim 1, characterized in that the notch is a lock buckle or a flat buckle when the wooden floor is notched.

5. The production method of wooden floor according to claim 1, characterized in that:
   in the step a, the core board has a thickness of 6 mm-12 mm;
   in the step b an upper steel board for the hot press having a temperature of 180° C.–210° C., a lower steel board has a temperature of 180° C.-220° C., the hot press continuing 20 seconds-30 seconds with a pressure of 10 MPa-15 MPa; and
   in the step d, the skin layer has a thickness of 0.3 mm-3 mm, 80 g-400 g of glue is used for the adhering and the temperature for the hot press is 90° C.-110° C., and the hot press continues 350 seconds-450 seconds.

6. The production method of wooden floor according to claim 1, characterized in that:
   in the step a, the core board has a thickness of 9 mm;
   in the step b, 85 g of glue is used for the adhering, and an upper steel board for the hot press has a temperature of 195° C., a lower steel board for the hot press has a temperature of 203° C., the hot press continuing 27 seconds with a pressure of 13.5 MPa;
   in the step d, the skin layer has a thickness of 1.0 mm, 200 g of glue is used for the adhering, and the temperature for the hot press is 100° C., the hot press continuing 400 seconds; and
   the conditioning time in the step a, the step c and the step e being 7 days-10 days.

7. A production method of a wooden floor, comprising the following steps:
   a. using a core board as a base material, and conditioning the base material to obtain a semi-finished product A;
   b. adhering a back layer to the lower surface of the semi-finished product A, and then performing hot press to obtain a semi-finished product B;
   c. conditioning the semi-finished product B to obtain a semi-finished product C;
   d. adhering a skin layer to the upper surface of the semi-finished product C, and then pressing the skin layer to the upper surface of the semi-finished product C by cold press to obtain the wooden floor; and
   e. notching and painting the wooden floor.

8. The production method of wooden floor according to claim 7, characterized in that:
   in the step a, the core board has a thickness of 6 mm-12 mm;
   in the step b, an upper steel board for the hot press has a temperature of 180° C.–210° C., a lower steel board for the hot press has a temperature of 180° C.-220° C., the hot press continues 20 seconds-30 seconds with a pressure of 10 MPa-15 MPa; and
   in the step d, the skin layer has a thickness of 0.3 mm-3 mm, 30-100 g of glue is used for the adhering, a pressure for the cold press is 1 MPa-20 MPa, and then resting the product for 12-36 hours after the cold.

9. The production method of wooden floor according to claim 7, characterized in that:
   in the step a, the core board has a thickness of 9 mm; in the step b, 85 g of glue is used for the adhering, an upper steel board for the hot press having a temperature of 195° C., a lower steel board for the hot press having a temperature of 203° C., the hot press continuing 27 seconds with a pressure of 13.5 MPa in the step d, the skin layer has a thickness of 1.0 mm, 35 g of glue is used for the adhering, a pressure for the cold press is 10 MPa, and resting the product for 24 hours after the cold press; and the conditioning time in the step a and the step c being 7 days-10 days.

10. A production method of wooden floor, characterized in that using the production method of wooden floor according to claim 1, wherein the step of connecting a back layer to the lower surface of the core board is replaced with a step of providing a paint layer on the lower surface of the core board.

11. The production method of wooden floor according to claim 10, characterized in that the core board is a high density board or a flake board, and the skin layer is a natural veneer or a PVC surface layer.

12. The production method of wooden floor according to claim 10, characterized in that the method further comprises: connecting one or more of a silence pad, a moisture-proof pad and a cork pad to the lower surface of the paint layer.

13. The production method of wooden floor according to claim 10, characterized in that the notch is a lock buckle or a flat buckle when the wooden floor is notched.

14. The production method of wooden floor according to claim 10, characterized in that comprising the following steps:
   a. using a core board as a base material, and conditioning the base material to obtain a semi-finished product A;
   b. providing a paint layer on the lower surface of the semi-finished product A to obtain a semi-finished product B;
   c. adhering a skin layer to the upper surface of the semi-finished product B, and then pressing the skin layer to the upper surface of the semi-finished product B by hot press to obtain a semi-finished product C;
   d. conditioning the semi-finished product C to obtain the wooden floor; and
   e. notching and painting the wooden floor.

15. The production method of wooden floor according to claim 14, characterized in that:
   the step a comprising using a core board having a thickness of 6 mm-12 mm as a base material, and conditioning the base material to obtain a semi-finished product A;
   the step b comprising spraying a paint of 20 g-150 g on the lower surface of the semi-finished product A to obtain a semi-finished product B; and
   the step c comprising adhering a skin layer having a thickness of 0.3 mm-3 mm to the upper surface of the semi-finished product B by using 80 g-400 g of glue, and then pressing the skin layer to the upper surface of the semi-finished product B by hot press with a temperature of 90° C.-110° C., and the hot press continuing 350 seconds-450 seconds, to obtain a semi-finished product C.

16. The production method of wooden floor according to claim 14, characterized in that:
   the step a comprising using a core board having a thickness of 9 mm as a base material, and conditioning the base material to obtain a semi-finished product A;

the step b comprising spraying 30 gram of paint on the lower surface of the semi-finished product A to obtain a semi-finished product B;

the step c comprising adhering a skin layer having a thickness of 1.0 mm to the upper surface of the semi-finished product B by using 200 g of glue, and then pressing the skin layer to the upper surface of the semi-finished product B by hot press with a temperature of 100° C., and the hot press continuing 400 seconds, to obtain a semi-finished product C; and the conditioning time in the step a and the step d being 7 days-10 days.

17. The production method of wooden floor according to claim 10, characterized in that comprising the following steps:
   a. using a core board as a base material, and conditioning the base material to obtain a semi-finished product A;
   b. providing a paint layer on the lower surface of the semi-finished product A to obtain a semi-finished product B;
   c. adhering a skin layer to the upper surface of the semi-finished product B, and then pressing the skin layer to the upper surface of the semi-finished product B by cold press to obtain the wooden floor; and
   d. notching and painting the wooden floor.

18. The production method of wooden floor according to claim 17, characterized by:
   the step a comprising using a core board having a thickness of 6 mm-12 mm as a base material, and conditioning the base material to obtain a semi-finished product A;

the step b comprising spraying a paint of 20 g-150 g on the lower surface of the semi-finished product A to obtain a semi-finished product B; and the step c comprising adhering a skin layer having a thickness of 0.3 mm-3 mm to the upper surface of the semi-finished product B by using 30-100 g of glue, then pressing the skin layer to the upper surface of the semi-finished product B by cold press with a pressure of 1 MPa-20 MPa, and resting the product for 20-24 hours after the cold press to obtain the wooden floor.

19. The production method of wooden floor according to claim 17, characterized in that:
   the step a comprising using a core board having a thickness of 9 mm as a base material, and conditioning the base material to obtain a semi-finished product A, the conditioning time being 7 days-10 days;

the step b comprising spraying 30 grams of paint on the lower surface of the semi-finished product A to obtain a semi-finished product B; and the step c comprising adhering a skin layer having a thickness of 1.0 mm to the upper surface of the semi-finished product B by using 35 g of glue, then pressing the skin layer to the upper surface of the semi-finished product B by cold press with a pressure of 10 MPa, and resting the product for 24 hours after the cold press to obtain the wooden floor.

* * * * *